May 16, 1950  V. LENCI ET AL  2,507,793
BOAT TRAILING ARRANGEMENT
Filed June 9, 1947
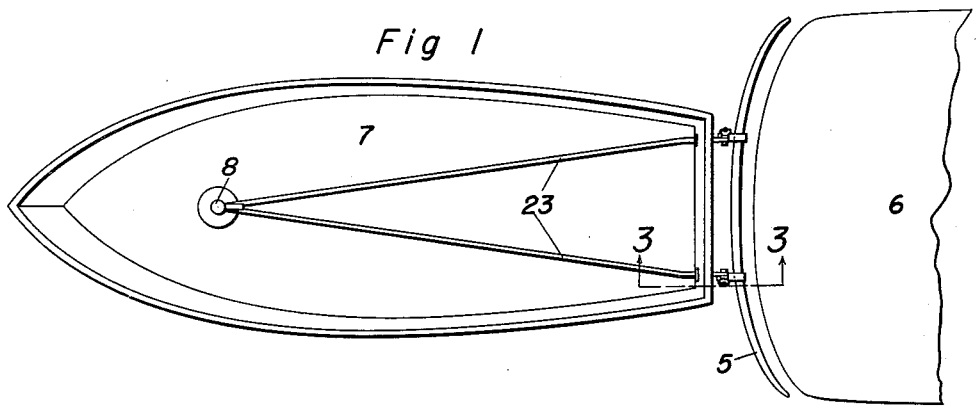
Fig 1
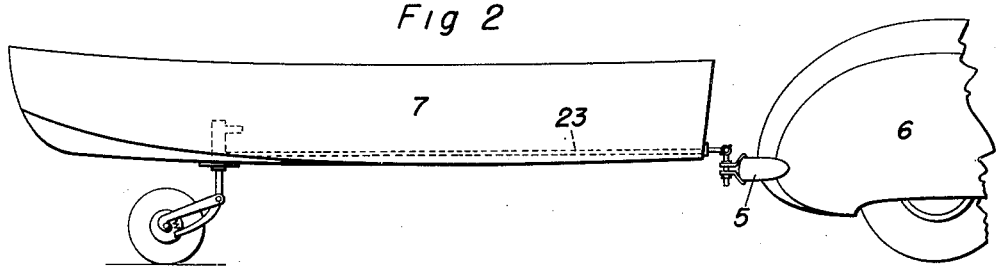
Fig 2
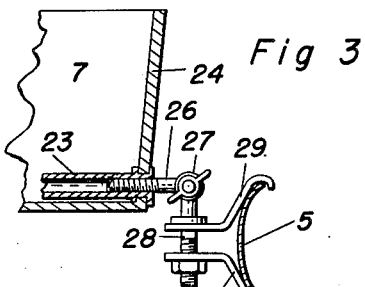
Fig 3
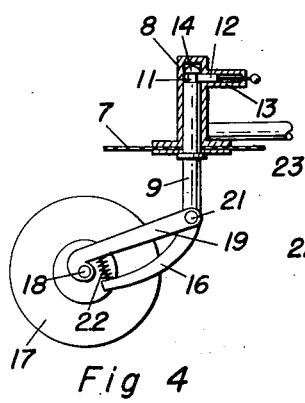
Fig 4
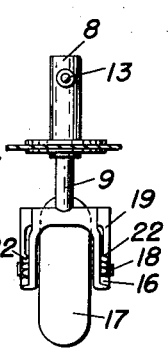
Fig 5
Fig 6
INVENTOR.
Victor Lenci
BY Raymond Lenci
Att'y Patented May 16, 1950

2,507,793

UNITED STATES PATENT OFFICE 2,507,793

BOAT TRAILING ARRANGEMENT

Victor Lenci and Raymond Lenci,
San Rafael, Calif.

Application June 9, 1947, Serial No. 753,554

2 Claims. (Cl. 9—1)

This invention relates to improvements in boat trailing arrangements and has particular reference to means for towing a boat behind a motor vehicle.

The principal object of this invention is to produce a device of this character which may be attached to the boat so as to become a permanent part thereof.

A further object is to produce a device which may be quickly attached and detached from the towing vehicle; also, a device which will not impart severe strain upon the hull of the boat being towed.

A still further object is to produce a device wherein the supporting wheel may be easily removed or replaced from the hull of the boat and in such a manner that a caster effect will take place.

Another object is to produce a device of this character which is economical to manufacture and install.

Other objects and advantages will be apparent during the course of the following description.

In the accompanying drawings forming a part of this specification and in which like numerals are employed to designate like parts throughout the same, Fig. 1 is a top plan view of a boat hull having our invention applied thereto and attached to the rear bumper of a motor vehicle.

Fig. 2 is a side elevation of Fig. 1.

Fig. 3 is an enlarged fragmentary, cross sectional view taken on the line 3—3 of Fig. 1.

Fig. 4 is an enlarged detailed view partly in cross section showing the mounting of the caster wheel.

Fig. 5 is a front elevation of the caster wheel looking from the left of Fig. 4, and Fig. 6 is a fragmentary top plan view of the bumper attaching bracket.

In towing boats it has been customary to use dollies in which the boat is cradled, or to place the boat upon the top of a motor vehicle or in a separate trailer, all of which arrangements require a considerable amount of paraphernalia, which is expensive, cumbersome and difficult to handle.

Applicants have therefore devised means whereby the hull itself of the boat is attached to the vehicle, and through the use of a caster wheel the hull may be towed in a most expedient manner.

In the accompanying drawings wherein for the purpose of illustration is shown a preferred embodiment of our invention, the numeral 5 designates the rear bumper of a motor vehicle, the rear end of which is shown at 6.

At 7 we have shown a boat hull, within the bottom of which we secure an upstanding casting 8, having a bore, into which the upper end of a stud 9 is rotatably mounted.

This casting is secured to the bottom of the boat in any approved manner.

The stud 9 has a groove 11 formed in its upper end so as to receive a spring pressed pawl 12 slidable in an offset 13 formed upon the casting 8. The upper end of the stud is curved as shown at 14, the purpose of which will be later seen.

The lower end of the stud is bifurcated so as to form a curved fork 16, between which the wheel 17 moves. The wheel is journaled upon an axle 18, which is mounted in pivoted members 19 hinged as at 21, to the stud 9.

Springs 22 have their ends secured to the ends of the fork 16 and the pivoted members 19, which springs are of the expansion type.

Extending rearwardly from the casting 8 are tubular struts 23 which extend through the transom 24 (see Fig. 3), terminating in eyes 26, which are adapted to engage eyes 27, carried upon bolts 28 which extend through brackets 29, the ends of which engage the rear bumper 5.

Securing bolts 31 serve to hold the eyes 26 and 27 in hinged alignment during towing.

The result of this construction is that when the parts are attached to the motor vehicle, as shown in Figs. 1 and 2, movement of the motor vehicle will result in controlling action wherein the wheel 17 will move over the ground and at the same time will caster on the vertical axis of the stud 9 during the movement of the vehicle around a curved line.

When the location where the boat is to be used has been reached the bolts 31 are removed, the pawl 12 is retracted so that the stud 9 may be removed from the casting and the boat is then ready for use.

When it is desired to again tow the boat it is only necessary to place the stud 9 into the bore of the casting 8 and the round head 14 will force the pawl 12 against the tension of its spring so that the stud will come to rest with the groove 11 engaged by the end of the pawl.

By now replacing the bolts 31 the boat will be effectively connected to the motor vehicle.

The struts 23 will act to transmit the pull directly to the casting and, therefore, all strain will be relieved from the body of the boat.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. In a device of the character described, a boat hull, a casting mounted in the forward medial end of said boat and on the medial line of the bottom of the boat, a stud extending through the bottom of said boat and into said casting, means for rotatively retaining said stud in said casting, the lower end of said stud being curved and forked, a wheel resiliently carried by said stud in such a manner as to produce a caster effect and a pair of braces extending from said casting to and through the rear end of said boat, and means for removably connecting said braces to a towing vehicle.

2. In a device of the character described a boat hull having a resiliently-supported wheel removably mounted in the bottom of said hull and on the medial line of the bottom of the boat, and a pair of braces extending from said wheel mounting along the bottom of said boat to and through the transom of the boat, said braces having their extremities threaded, eye bolts threadily engaging said threaded braces whereby said hull may be connected thereby to a towing vehicle.

VICTOR LENCI.
RAYMOND LENCI.

REFERENCES CITED

The following references are of record in the file of this patent:

UNITED STATES PATENTS

| Number | Name | Date |
|---|---|---|
| 2,157,186 | Pinter et al. | May 9, 1939 |